(12) United States Patent
Hoher

(10) Patent No.: US 6,860,832 B2
(45) Date of Patent: Mar. 1, 2005

(54) TRANSMISSION ASSEMBLY

(75) Inventor: Markus Hoher, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/182,272

(22) PCT Filed: Mar. 10, 2001

(86) PCT No.: PCT/EP01/02691
§ 371 (c)(1),
(2), (4) Date: Jul. 25, 2002

(87) PCT Pub. No.: WO01/69106
PCT Pub. Date: Sep. 20, 2001

(65) Prior Publication Data
US 2003/0004028 A1 Jan. 2, 2003

(30) Foreign Application Priority Data
Mar. 17, 2000 (DE) .......................... 100 13 179

(51) Int. Cl.[7] .................. F16H 13/06; F16H 13/10; F16H 15/48; F16H 31/00; F16H 3/44
(52) U.S. Cl. .................. 475/317; 475/114; 475/116
(58) Field of Search .................. 475/210, 114, 475/116, 213, 214, 302, 293, 343, 317

(56) References Cited

U.S. PATENT DOCUMENTS

| 4,392,394 A | | 7/1983 | Hofbauer et al. ............. 74/689 |
|---|---|---|---|
| 4,470,117 A | * | 9/1984 | Miki et al. ..................... 701/51 |
| 4,628,766 A | * | 12/1986 | de Brie Perry ............. 475/216 |
| 4,685,358 A | | 8/1987 | Itoh ............................. 74/868 |
| 4,836,052 A | * | 6/1989 | Iwanaga et al. ............. 475/148 |
| 4,955,852 A | | 9/1990 | Morisawa ..................... 475/146 |
| 5,092,201 A | * | 3/1992 | Hatakawa et al. .......... 475/129 |
| 6,085,880 A | * | 7/2000 | Kuhn et al. ................. 192/3.52 |
| 6,155,951 A | * | 12/2000 | Kuhn et al. ................. 475/216 |
| 6,244,985 B1 | | 6/2001 | Wafzig et al. ................ 476/42 |
| 6,540,638 B2 | * | 4/2003 | Sulzmann .................... 475/210 |

FOREIGN PATENT DOCUMENTS

| DE | 29 48 194 | | 6/1980 | .......... F16H/37/06 |
|---|---|---|---|---|
| DE | 29 44 928 A1 | | 6/1981 | .......... B60K/17/00 |
| DE | 197 80 383 T1 | | 4/1998 | .......... B60K/17/34 |
| DE | 198 44 374 A1 | | 3/2000 | .......... F16H/61/02 |
| EP | 0 199 533 A1 | | 10/1986 | .......... F16H/37/04 |
| EP | 0 350 200 A1 | | 1/1990 | .......... F16H/37/02 |
| EP | 0 787 927 A2 | | 8/1997 | .......... F16H/37/02 |
| GB | 2 045 368 A | | 10/1980 | .......... B60K/17/04 |
| JP | 07180758 A | | 7/1995 | .......... F16H/37/02 |
| WO | 99/05433 | | 2/1999 | .......... F16H/15/38 |

* cited by examiner

Primary Examiner—Tisha Lewis
(74) Attorney, Agent, or Firm—Davis & Bujold, P.L.L.C.

(57) ABSTRACT

The transmission assembly, specially for motor vehicles, has a housing, a drive shaft, a countershaft and an arrangement for changing the reduction ratio between the drive shaft and the countershaft which contains a continuously variable transmission and downstream thereof a mechanical transmission with shifting elements in the form of clutches and brakes and a planetary gear set for shifting the reverse gear and one or more forward gears.

6 Claims, 2 Drawing Sheets

TRANSMISSION ASSEMBLY

FIELD OF THE INVENTION

The invention relates to a transmission assembly comprising a housing, a drive shaft, a countershaft and an arrangement for changing the reduction ratio between the drive shaft and the countershaft, which arrangement has a continuously variable transmission and downstream thereof a mechanical transmission with shifting elements in the form of clutches and brakes, and a planetary gear set for shifting the reverse gear and one or more forward gears.

BACKGROUND OF THE INVENTION

Continuously variable transmission (CVT) are variously known in the form of belt drive transmission or in the form of toroidal drives. The Applicant's DE 198 44 374.9 thus describes a belt drive transmission which has a first cone pulley pair upon a drive shaft and a second cone pulley pair upon an output shaft, each cone pulley pair consisting of a first pulley stationary in axial direction and a second cone pulley movable in axial direction (respectively primary pulleys and secondary pulley). Between the cone pulley pairs extends a belt drive organ such as a pushing linked band. The primary and secondary pulleys are adjusted by a pressure medium with the aid of an electronic control device which via electromagnetic actuators and hydraulic valves controls the pressure level of the adjusting spaces of primary pulley and secondary pulley.

The toroidal drive has been described, for example, in the Applicant's WO 99/05433. It has input and output pulleys arranged in pairs and situated coaxially to a common shaft with their inner faces toroidally configured, the same as friction wheels placed between the pairs of input and output pulleys. The friction wheels are in frictional contact both with the input pulleys and with the output pulleys and transmit by frictional-engagement contact the torque transmitted to them by the input pulley to the output pulley, the rotational speed of the friction wheels being higher the greater the distance between their point of contact with the input pulley and the axis of rotation. The rotational speed of the output pulley, on the other hand, is higher the closer the contact point between friction wheel and output pulley is to the axis of rotation. By tilting the friction wheel sit is accordingly possible continuously and arbitrarily to adjust the rotational speed of the output pulley. To this end, the axes of rotation of the friction wheels are supported on a carrier which can be controlled via a swiveling device. Both input pulleys of both transmission assemblies are here non-turnably connected with a torque shaft while both output pulleys of both transmission assemblies, which are disposed in the transmission with reciprocal mirror symmetry and side by side, are arranged upon a common bushing turnably supported upon the torque shaft. The torque shaft is penetrated by an input shaft which is connected with a starting element of a motor vehicle such as a torque converter or a wet-running starting clutch of the prime mover of the vehicle.

The problem on which this invention is based is to reduce the installation space needed for this transmission assembly and to simplify the oil supplies.

SUMMARY OF THE INVENTION

In the embodiment of the inventive transmission assembly, the parts of the mechanical transmission are disposed in a manner such that downstream of the continuously variable transmission is a brake for the reverse gear with integrated oil supply, that downstream of said brake is a clutch for the second range, that downsream of said clutch is a planetary gear set, that downstream of said planetary gear set is a clutch or the first range with integrated oil supply and that a spur pinion is downstream of said clutch.

This particular arrangement of the individual parts makes possible not only a compact design with reduced need of space but also a simplification of the oil supplies which are integrated one in a brake and one in a clutch. Besides, a modular construction of the transmission assembly is possible, that is, in the final assembly only two front-mounted units have to be mounted whereby the final assembly is accelerated.

In the embodiment of the inventive transmission assembly, the arrangement of the parts of the mechanical transmission is selected so that the clutch for the first range is interchanged with the spur pinion whereby a shorter countershaft can be used and the spur pinion can be situated closer to the engine of the motor vehicle. Thereby the space in the rear, that is, the part on the output side, is further reduced.

In the embodiment of the inventive transmission assembly, the parts of the mechanical transmission are disposed so that the clutch for the first range is interchanged with the spur pinion and the planetary gear set in the serial arrangement, which makes possible an alternative tying of the planetary gear set and the output takes place via the web thereof; the countershaft can also be designed shorter here whereby the installation space in the rear part, that is, the part on the output side of the transmission assembly, is reduced.

BRIEF DESCRIPTION OF THE DRAWINGS

The invention will now be described, by way of example, with reference to the accompanying drawings in which.

DETAILED DESCRIPTION OF THE INVENTION

Figure 1:
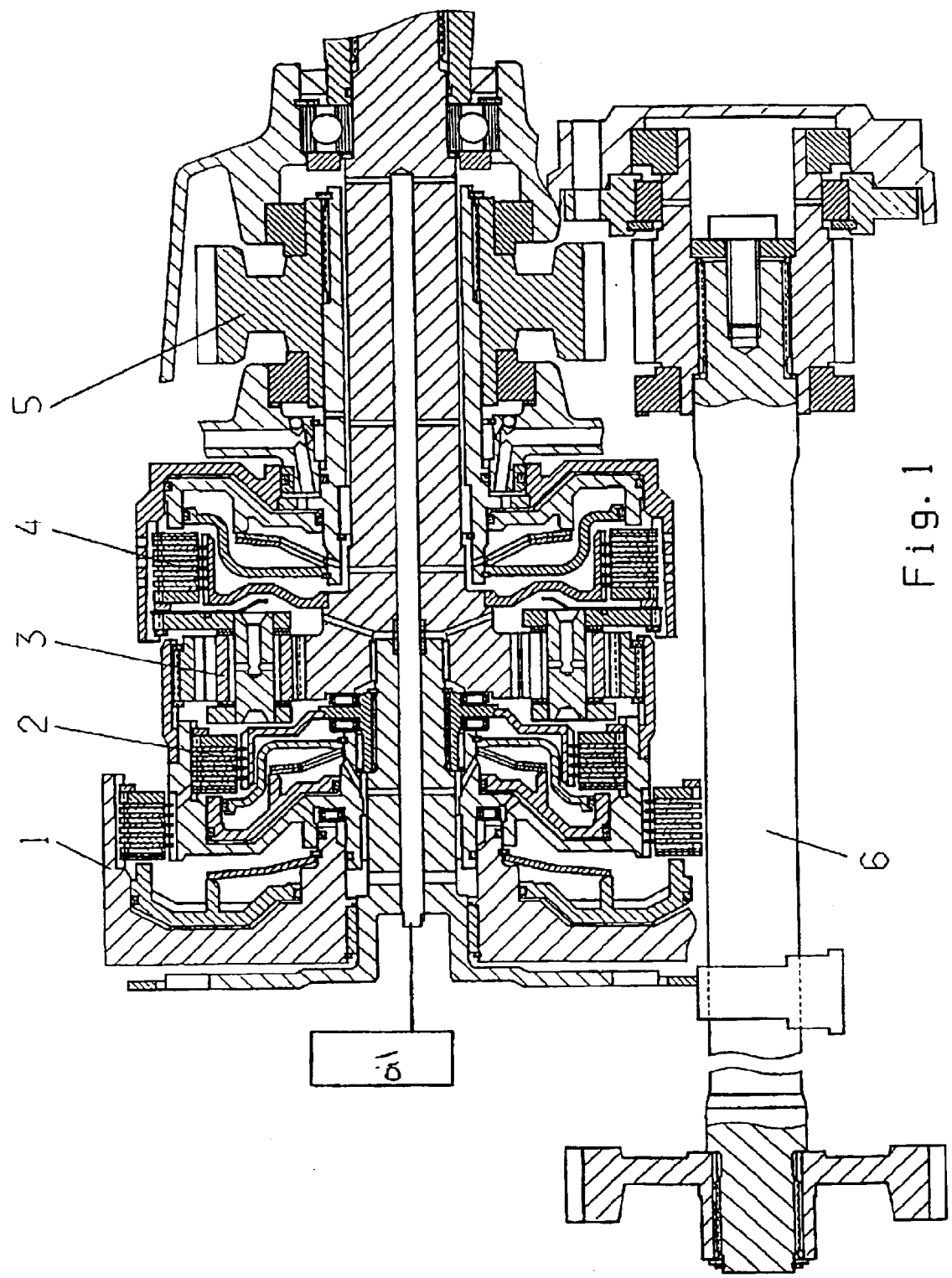
FIG. 1 diagrammatically shows an axial section through a first embodiment of the construction of the mechanical transmission.

In the longitudinal section shown in FIG. 1 through the rear, that is, the output side range, of an inventive transmission assembly which is downstream of the continuously variable transmission (not shown), that is, either a belt drive of a toroidal drive the arrangement of the individual parts is selected as follows.

Downstream of the brake 1 for the reverse gear with integrated oil supply is a clutch 2 for the second range; downstream of said clutch 2 is a planetary gear set 3; downstream of said planetary gear set 3 is a clutch 4 for the first range likewise with integrated oil supply; downstream of said clutch 4 is a spur pinion 5 which is in operative connection with the countershaft 6.

The arrangement of the individual parts of the mechanical transmission makes possible not only a compact design with simplified oil supplies but also a modular construction so that in the final assembly only two front-mounted units have to be joined to accelerate the final assembly.

Figure 2:
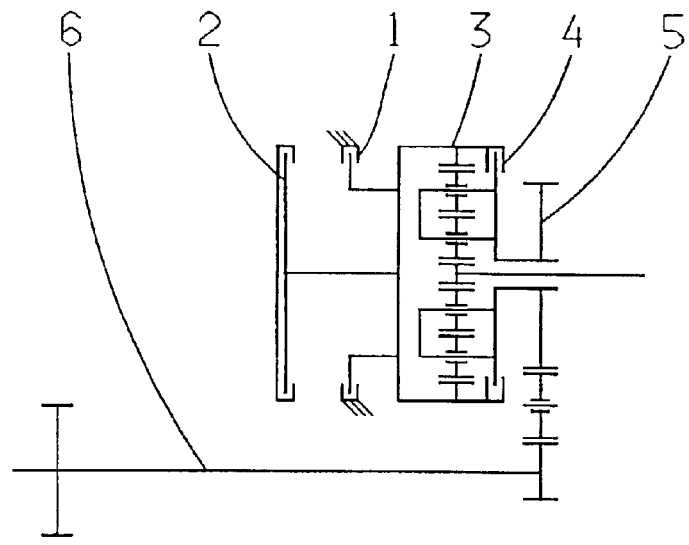
FIG. 2 shows the transmission diagram of said first embodiment.

In FIG. 2 is shown the appertaining transmission diagram for the construction of the mechanical transmission explained in FIG. 1.

Figure 3:
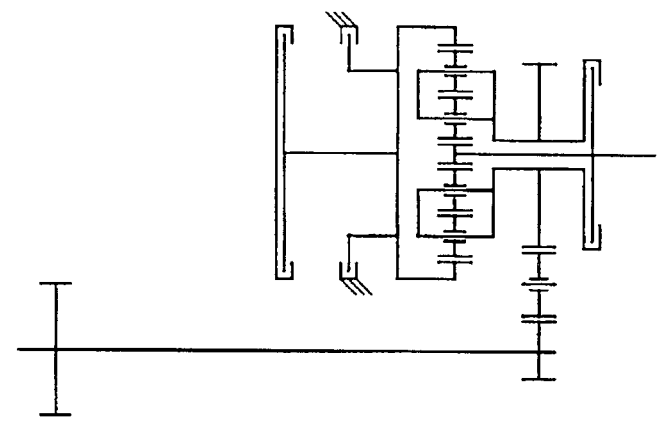
FIG. 3 shows the transmission diagram of the second embodiment.

In another embodiment of the arrangement of the parts of the mechanical transmission, as it is to be understood from the transmission diagram of FIG. 3, the parts are disposed so that the clutch 4 for the first range is exchanged with the spur pinion 5 whereby a shorter countershaft 6 can be used and the spur pinion 5 moves closer to the continuously variable transmission and thus to the engine of the motor vehicle. This means a reduced installation space in the rear part of the transmission assembly, that is, in the mechanical transmission.

Figure 4:
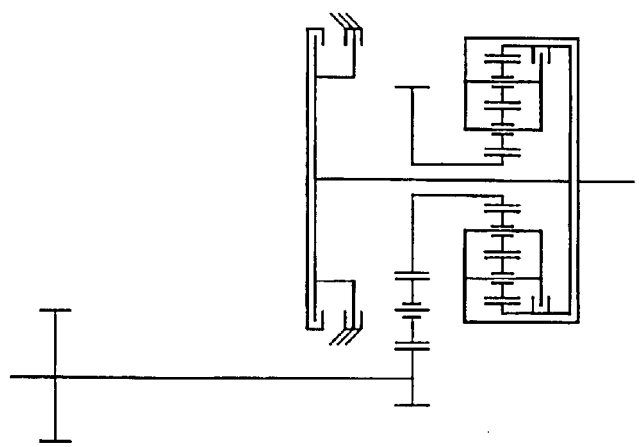
FIG. 4 shows the transmission diagram of the third embodiment according to the invention.

In one other inventive embodiment shown in the transmission diagram in FIG. 4, the parts are arranged in the mechanical transmission so that clutch 4 for the first range is exchanged with the spur pinion 5 and the planetary gear set 6 whereby an alternative tying of the planetary gear set 3 is made possible by the output taking place via the web. The countershaft 6 can thereby be further shortened and thus the installation space of the rear part of the transmission assembly, that is, in the mechanical transmission, can still be more reduced.

REFERENCE NUMERALS 1 brake
2 clutch
3 planetary gear set
4 clutch
5 spur pinion
6 countershaft

What is claimed is:

1. A transmission assembly, especially for motor vehicles, comprising:
    a housing,
    a drive shaft,
    a countershaft; and
    an arrangement for changing the reduction ratio between the drive shaft and the countershaft which has a continuously variable transmission and drivingly downstream thereof a mechanical transmission with shifting elements in the form of clutches and brakes, and a planetary gear set for shifting of the reverse gear and one or more forward gear ranges;
    wherein the parts of the mechanical transmission are sequentially disposed as follows:
        beginning downstream of the continuously variable transmission is a brake (1) for the reverse gear with integrated oil supply;
        downstream and adjacent the brake (1) is a first clutch (2) for a second range;
        downstream and adjacent the first clutch (2) is a planetary gear set (3);
        downstream and adjacent the planetary gear set (3) is a second clutch (4) for a first gear range with an integrated oil supply; and
        downstream and adjacent the second clutch (4) is a spur pinion.

2. A transmission assembly, especially for motor vehicles, comprising:
    a housing,
    a drive shaft,
    a countershaft; and
    an arrangement for changing the reduction ratio between the drive shaft and the countershaft which has a continuously variable transmission and downstream thereof a mechanical transmission with shifting elements in the form of clutches and brakes, and a planetary gear set for shifting of the reverse gear and one or more forward gear ranges;
    wherein the parts of the mechanical transmission are disposed as follows:
        downstream of the continuously variable transmission is a brake (1) for the reverse gear with an integrated oil supply;
        downstream of the brake (1) is a clutch (2) for a second gear rang;
        downstream of the clutch (2) is a planetary gear set (3);
        downstream of the planetary gear set (3) is a spur pinion (5); and
        downstream of the spur pinion (5) is a clutch (4) for a first range with integrated oil supply.

3. A transmission assembly, especially for motor vehicles, comprising:
    a housing,
    a drive shaft,
    a countershaft: and
    an arrangement for changing the reduction ratio between the drive shaft and the countershaft which has a continuously variable transmission and downstream thereof a mechanical transmission with shifting elements in the form of clutches and brakes, and a planetary gear set for shifting the reverse gear and one or more forward gear ranges;
    wherein the parts of the mechanical transmission are disposed as follows:
        downstream of the continuously variable transmission is a brake (1) for the reverse gear with integrated oil supply;
        downstream of the brake (1) is a clutch (2) for a second gear range;
        downstream of the clutch (2) is a spur pinion (5);
        downstream of the spur pinion (5) is a planetary gear set (3); and
        downstream of the planetary gear set (3) is a clutch (4) for a first gear range with integrated oil supply.

4. Transmission assembly, especially for motor vehicles, comprising a housing, a drive shaft, a countershaft and an arrangement for changing the reduction ratio between the drive shaft and the countershaft which has a continuously variable transmission and downstream thereof a mechanical transmission with shifting elements in the form at clutches and brakes, and a planetary gear set for shifting of the reverse gear and one or more forward gears, wherein the parts of the mechanical transmission are arranged sequentially along an axis of the drive shaft as follows:
    beginning downstream of the continuously variable transmission s a brake (1) for the reverse gear with integrated oil supply;
    downstream and adjacent the brake (1) is a first clutch (2) for the second range;
    downstream and adjacent the first clutch (2) is a planetary gear set (3);
    downstream and adjacent the planetary gear set (3) is a second clutch (4) for the first range with integrated oil supply; and
    downstream and adjacent the second clutch (4) is a spur pinion.

5. Transmission assembly, specially for motor vehicles, comprising a housing, a drive shaft, a countershaft and an arrangement for changing the reduction ratio between the drive shaft and the countershaft which has a continuously variable transmission and downstream thereof a mechanical transmission with shifting elements in the form of clutches and brakes, and a planetary gear set for shifting of the reverse gear and one or more forward gears, wherein the parts of the mechanical transmission are sequentially disposed in a direction of power flow as follows:

downstream of the continuously variable transmission is a brake (1) for the reverse gear with integrated oil supply;

downstream of the brake (1) is a clutch (2) for the second range;

downstream of the clutch (2) is a planetary gear set (3);

downstream of the planetary gear set (3) is a spur pinion (5); and downstream of the spur pinion (5) is a clutch (4) for the first range with integrated oil supply.

6. Transmission assembly, specially for motor vehicles, comprising a housing, a drive shaft, a countershaft end an arrangement for changing the reduction ratio between the drive shaft and the countershaft which has a continuously variable transmission and downstream thereof a mechanical transmission with shifting elements in the form of clutches and brakes, and a planetary gear set for shifting the reverse gear and one or more forward gears, wherein the parts of the mechanical transmission are sequentially disposed in a direction of power flow as follows:

downstream of the continuously variable transmission is a brake (1) for the reverse gear with integrated oil supply;

downstream of the brake (1) is a clutch (2) for the second range;

downstream of the clutch (2) is a spur pinion (5): downstream of the spur pinion (5) is a planetary gear set (3); and downstream of the planetary gear set (3) is a clutch (4) for the first range with integrated oil supply.

\* \* \* \* \*